(12) United States Patent
Krenkel et al.

(10) Patent No.: US 6,273,924 B1
(45) Date of Patent: Aug. 14, 2001

(54) TOOL FOR MACHINING WORKPIECES BY CUTTING

(75) Inventors: Walter Krenkel, Renningen; Richard Kochendoerfer, Stuttgart; Martin Friess, Frickenhasusen, all of (DE)

(73) Assignee: Deutsches Zentrum fuer Luft-und Raumfahrt, Bonn (DE)

( * ) Notice: Subject to any disclaimer, the term of this patent is extended or adjusted under 35 U.S.C. 154(b) by 0 days.

(21) Appl. No.: 09/355,515

(22) PCT Filed: Jan. 21, 1998

(86) PCT No.: PCT/EP98/00291

§ 371 Date: Jul. 28, 1999

§ 102(e) Date: Jul. 28, 1999

(87) PCT Pub. No.: WO98/33625

PCT Pub. Date: Aug. 6, 1998

(30) Foreign Application Priority Data

Jan. 30, 1997 (DE) .............................. 197 03 202

(51) Int. Cl.⁷ ............................ B24D 3/06; B24D 17/00; B24D 5/04; B24B 3/34; B24B 33/08
(52) U.S. Cl. ................................ 51/307; 51/309; 51/308; 51/293; 451/540; 451/546; 428/221; 428/408; 428/293.4
(58) Field of Search .............................. 51/307, 308, 309, 51/293; 501/99; 428/221, 408, 446, 293.4; 451/540, 546

(56) References Cited

U.S. PATENT DOCUMENTS

| 4,453,951 | * | 6/1984 | Ohno | ........ 51/307 |
| 4,504,284 | * | 3/1985 | Ohno | ........ 51/307 |

FOREIGN PATENT DOCUMENTS 4106005    8/1992   (DE) .

* cited by examiner

*Primary Examiner*—Michael Marcheschi
(74) *Attorney, Agent, or Firm*—Milde, Hoffberg & Macklin, LLP

(57) ABSTRACT

A tool for machining workpieces, specially metal workpieces, by cutting, e.g., grinding, polishing, milling, separating or honing, comprising at least one stock-removing tool portion and whose machining range consists of a composite material containing a hard material. Said tool is characterized in that the composite material is formed by a fiber structure consisting of substantially continuous fibers made of carbon and/or a ceramic material and by a matrix containing carbon and hard material, and is also characterized in that at least the machining range, like the cutting or milling tool, is made of said composite material.

34 Claims, 4 Drawing Sheets

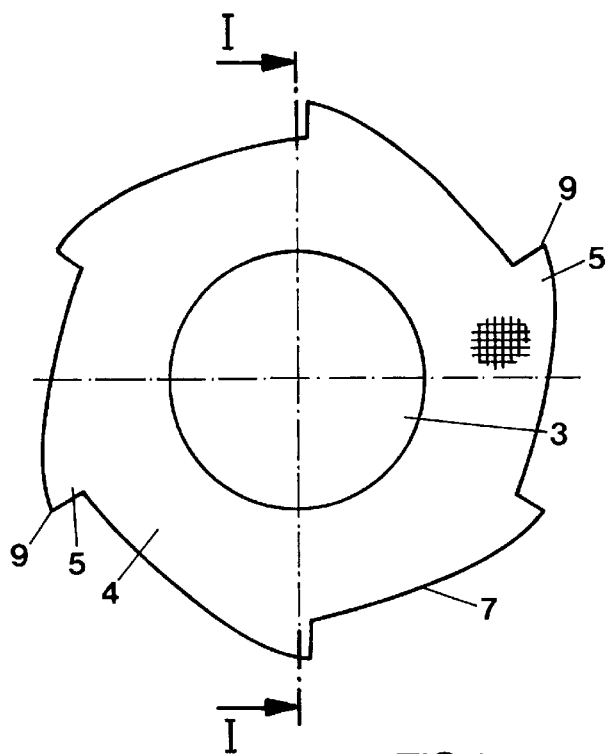
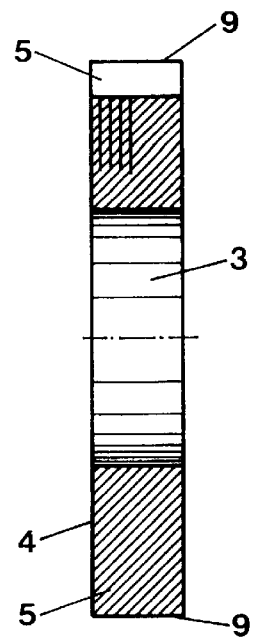
FIG. 1A  FIG. 1B
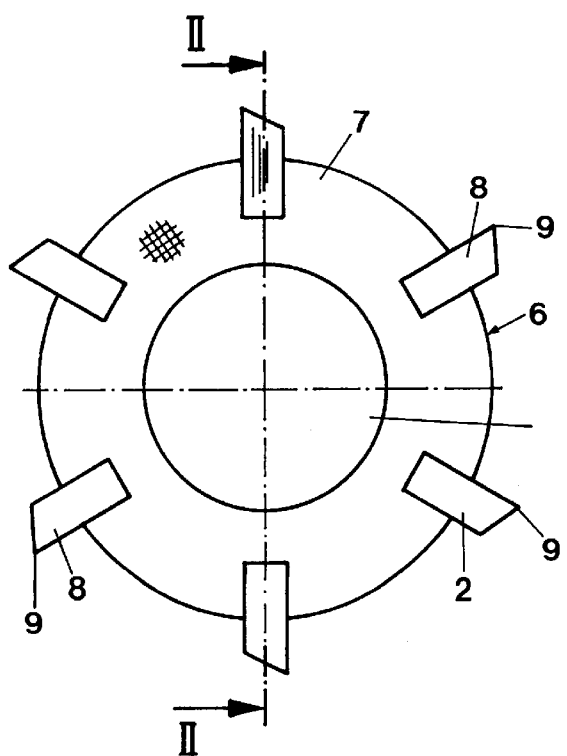
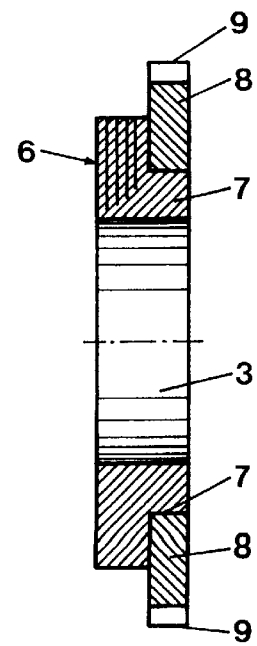
FIG. 2A  FIG. 2B

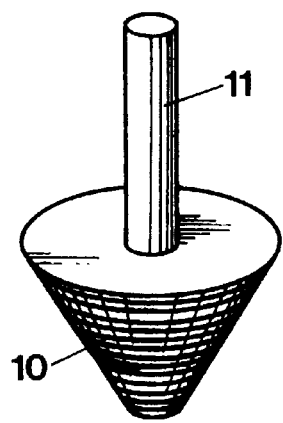
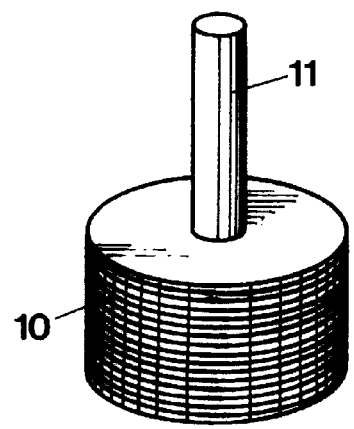
FIG. 5A          FIG. 5B
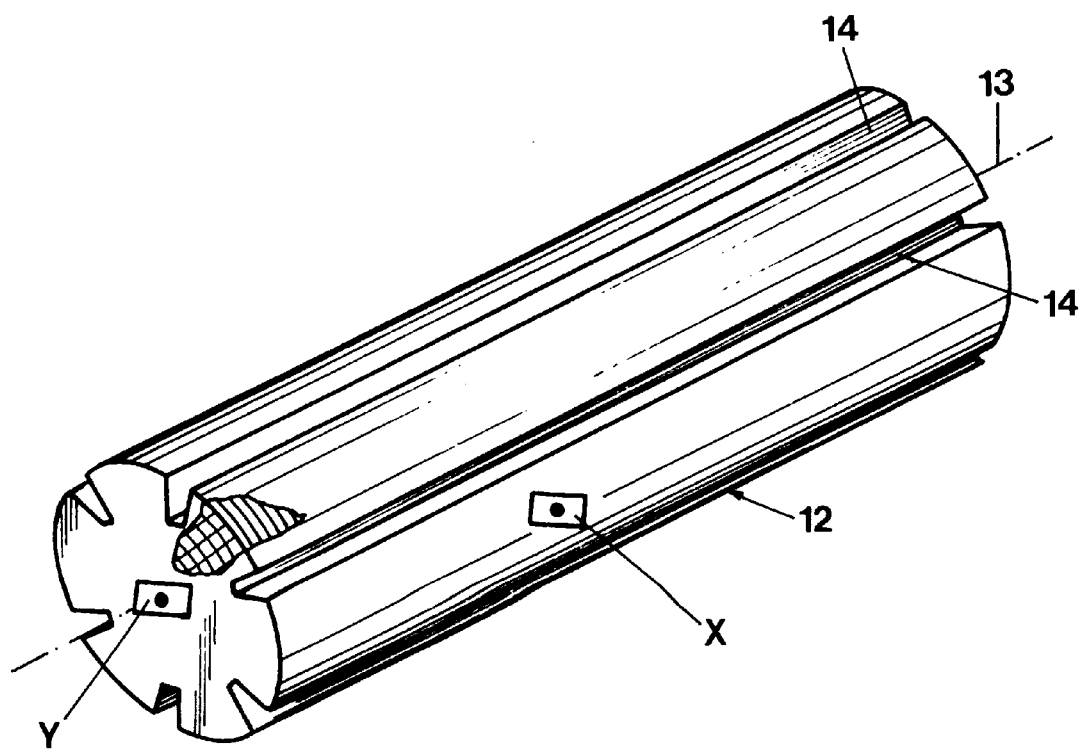
FIG. 6

TOOL FOR MACHINING WORKPIECES BY CUTTING

BACKGROUND OF THE INVENTION

The present invention relates to a tool for machining operations such as grinding, polishing, milling, cutting-off or honing workpieces, particularly for machining workpieces made of metal, where the tool features at least one machining die and where at least the working area of said die consists of a composite material that contains a hard material.

A tool for machining of the aforementioned type is known from the German Patent No. DE-A1 41 06 005. Such tools are used in various applications that basically include the areas of milling, cutting, honing and grinding by means of material removal. Very important in such processes is a precise removal of the material. In addition, such tools should achieve a long service life, that is, it should be possible to use them over a long period with appropriate reproducible and controllable material removal in regard to the desired precision as well. The service life of such tools is basically determined by the hard materials that are present in the working area of the tool. Such hard materials exhibit sharp-edges structures due to the fact that they are crystalline components. Over the duration of machining, this sharp-edged crystalline structure is destroyed such that the abrasive effect of the tool is reduced. Depending on the type of materials being machined with such a tool and, additionally, depending on the machining speed, that is, the speed that the tool exerts on the surface to be machined, and the high temperatures that the tool must withstand, will occur especially in the working area.

The grinding and cutting tool as described in the above referenced German Patent No. DE-A1 41 06 005, includes a substrate body with a synthetic material matrix where the substrate body is carbon fiber enforced. A coating that contains hard materials in the form of diamond or boron nitride abrasive grains in the binding agent is applied to the substrate body itself. An electroplated or electroless deposited metal coating is situated on the substrate body as interim coating between the substrate body and the coating to obtain a better bond of the abrasive coating on the substrate body. The problem with such abrasion tools is that the temperature resistance is limited by that of the synthetic material. The synthetic material tends to become soft or to lose its bonding capacity, especially at high temperature influences, such that, especially at such conditions the inherent stability of the tool can no longer be ensured for precision work. This also results in complicated tool structures, for example, those to manufacture toothings, not being able to be manufactured such that they keep their stability, and thus, their shape, over an extended service life.

The U.S. Pat. No. 4,504,284 discloses a tool with a cubic carrier, where at least one of its edges is built as a cutting edge. The core body or carrier includes a filler material, carbon fibers and carbon black. The at least one cutting edge is located at one edge of the body and consists of diamond or cubic boron nitride crystals and is connected to said carrier body by an interim layer consisting of α- or β-silicon carbide, or mixtures thereof.

The Japanese Patent No. JP-A-06091541 discloses a grinding wheel whose deformation size is to be reduced when it is rotated under high speed (in relation to the centrifugal forces affecting the grinding wheel). For this purpose, the grinding wheel is made by hardening laminated material through epoxy resins and such, after carbon fibers are wound and laminated in the direction of the circumference. Such coiling strengthens the direction of the circumference of the grinding wheel. Due to the use of epoxy resins as a binding agent to harden the carbon structure, this grinding wheel is not designed for, or cannot be used at high temperatures, because an organic binding agent, such as epoxy resin, softens already at relatively low temperatures and thus loses the strength aimed for.

Finally, the U.S. Pat. No. 4,353,953 relates to an integral composite of polycrystalline diamond and/or cubic boron nitride fibers integrally bonded to a substrate supporting phase. The crystals in the phase of the polycrystalline diamond and/or cubic boron nitride are bonded to the phase of the carrier structure by a medium containing silicon carbide and elemental silicon. Thus, the material is present as a two-layer system, namely the crystals, such as diamonds that are bonded to a carrier body using Si and SiC.

SUMMARY OF THE INVENTION

Based on the aforementioned state-of-the-art and the problems associated with it, it is the objective of the current invention to manufacture a tool for machining that exhibits a high temperature stability, thermal shock resistance and damage tolerance and that can be manufactured with the required precision in any shape and dimension for the desired application.

For a tool with the features stated above, the aforementioned objected is achieved in that the composite material is formed of a fiber structure, which is made of generally continuous carbon and/or ceramic material fibers and is formed of a matrix that contains carbon and hard materials, and in that at least the working area, such as the cutting surfaces of a cutting or milling tool, is made of this composite material.

It is preferred that the fiber structure is made in the form of a web, a weave or a knit.

It is additionally preferred that the hard material is basically made using liquid infiltration of metals in situ.

The basic content of the tool is that at least the working area, for example the cutting edge, is made of fiber structure of continuous fibers comprising the basic structure for binding a matrix that contains the abrasive hard material as a significant component. Preferably, these hard materials are made in situ using liquid infiltration of a metal, that is, liquid metal is infiltrated into a defined open pore structure of the carbon-bound fiber structure. Instead of liquid infiltration, the metal can also be infiltrated in gaseous form, for example, by using the gas phase separation method.

Using this procedure, it is then no longer necessary to use, for example, synthetic materials for embedding the hard materials required for the abrasive effect of the tool surface. The fiber structure made of carbon and/or ceramic material has on the one hand the advantage of withstanding the high temperatures that occur during infiltration of the liquid metal into the porous structure, where said temperatures can be in above 1400° C. with the hard materials under consideration, and on the other hand a preform can made of this fiber structure that prior to liquid infiltration of the metal resembles closely the final contours of the tool to be manufactured, even when said tool has complicated surface structures. This structure of the preform made of carbon-bound carbon fibers and/or ceramic fibers forms an extremely stable basic structure that withstands the operating conditions of a machining tool and that permits sufficient free space, in the area of the working surface, such that the hard materials deposited in the matrix are exposed with their sharp-edged, crystalline structures to carry out the removal of material on the workpiece to be machined, yet are still firmly embedded in the matrix. While this fiber structure forms the stabilizing component during manufacturing, during the material removal, that is, the removal on the material to be machined, the stability of said fiber structure is overshadowed when compared to the embedded hard materials. Still, the fiber structure shows its positive quality and effect in that on the one hand the material strength, material rigidity and thermal shock resistance of the material are increased, and on the other hand, the fiber structures exposed on the work surface, that is, the continuous fibers that end in the surface area of the working area, exhibit a brush-type effect caused by the fiber ends passing over the machined surface and by doing so contribute to a certain degree to the removal of the material. The main reason for this defined arrangement of the fiber structure with the aforementioned effect is that the continuous fibers can be oriented in a defined manner in the fiber's structure.

Regarding the aforementioned brush-effect of the fiber structure, the fibers of the tool ending in the surface area of the working area are with their axes preferably oriented such that they exhibit a larger direction component in the direction of the area normal in the surface area of the working area than perpendicular to it. This means that the fibers end bristle-like in relation to the surface, in contrast to a parallel orientation to the surface, with the result that in addition to the brush-type effect the free area between the fibers accounts for a large portion that is filled with the crystalline hard materials.

With regard to the fiber structure it is advantageous if a significant portion of the fibers of said fiber structure is made of carbon; preferred is a portion of 50% to 100% with a fiber structure consisting of pure carbon fibers in many cases offering particular advantages, as will be shown subsequently. The preferred use of a carbon fiber structure is, on the on hand, due to the fact that carbon fibers, in an unprocessed condition, can be easily formed into a fiber structure, for example in the form of webs, weaves or knits, and on the other hand, due to the fact that such a carbon fiber structure after impregnating with a carbon-containing polymer using temperature treatment, can be solidified to an inherently stable prebody. In addition, the carbon fibers can also be partially used to form carbides with the infiltrated, liquid metal. Such metal carbides are the preferred hard materials for achieving the abrasive material removal.

A portion of the hard material should be present in the form of crystalline carbide. Crystalline carbide exhibits very sharp-edged crystal structures such as is conductive to an optimal removal of the material to be machined. The grain size of the crystalline carbide should be between 5 and 100 $\mu$m, preferably greater than 10 $\mu$m. It has been found that the removal performance in high performance machining is relatively low if the grain size is set too low, while with a grain size above 10 $\mu$m, an effect is achieved where the cutting edges continually renew themselves through breaking off of grains resulting in a significant increase in the cutting performance.

The crystalline carbide should be selected from the group silicon, titanium, zirconium, chromium or vanadium carbide. The respective metals, that is, silicon, titanium, zirconium, chromium and vanadium are particularly well suited for the aforementioned liquid infiltration because their melting point is below 2000° C., that is, the melting point of silicon is 1410° C., titanium 1683° C., zirconium 1852° C., chromium 1875° C. and vanadium 1919° C. It has been found that from the aforementioned group, silicon is preferred not only because of its low melting point, but also from the viewpoint that especially when carbon fibers are used for the fiber structure, portions of the silicon form silicon carbide with the carbon fibers such that a high ratio of hard materials can be achieved in the composite body.

Composites of off-grade metals can be used to lower the melting point even further, that is in regard to the liquid infiltration of the liquid metal into the porous structure around the fiber structure during the manufacture of the composite material body, such that eutectic mixtures are formed that do not cause excessive thermal stress to the fibers due to their low melting temperatures and additionally shorten the duration of the entire metal infiltration process. It is preferable to add boron to the metal melts, such as the silicon melt, where the portion of boron should be less than 10% of the entire metal that is deposited in the matrix. With a portion of boron of 3% of the entire metal, the melting point of silicon, for example, can be lowered to below 1385° C. In addition, borides and silicides are created that have a great abrasive effect and the grain growth of the silicon carbide is increased, which means that the removal performance and/or the service life of the tool can be increased.

The fibers of the fiber structure can also be made of non-oxidic, ceramic fibers, such as silicon carbide and/or silicon nitride or of fiber systems that contain silicon, boron, carbon and nitrogen. In the preferred embodiment with silicon carbide and/or silicon nitride fibers, the portion of silicon carbide and/or silicon nitride is between 50% and 100% with regard to the entire fiber structure. The result of using such silicon carbide fibers or silicon nitride fibers in contrast to using carbon fibers is that the potion of hard materials in the composite material is increased just before it is already present in the fibrous form.

The fiber volume content in relation to the unit of volume of the composite material is set to 20 to 70%, preferably to greater than 50%. A high fiber content per unit of volume, preferably in the range of 50% to 70% has the advantage that the result is a dense material with good embedding of the hard materials leading to a high grain-strength limit.

A defined setting of the abrasive properties of the composite material can be achieved by depositing filler materials in the form of powdery hard materials and/or powdery carbon in the matrix of the composite material. It is preferably if each filler component is present in an amount of less than 10 percent in weight of the composite material. Carbon, in powder form, should be deposited in the matrix in a defined portion if metal carbides are to be created, that is, carbon is made available in an amount sufficient to react with the metal deposited by liquid infiltration, for example, silicon to form silicon carbide. However, it is also possible to deposit hard materials in powder form in a specified grain size with a defined distribution in the matrix. By doing so, the hard material content, for example, the silicon carbide content of the composite material can be increased selectively resulting in an increase in the machining performance of the tool. Filler materials that are deposited in the matrix in such a manner should have a grain size in a range of 1 to 100 $\mu$m; good abrasive properties are achieved in this grain size range.

If carbon is deposited in the matrix as filler material, the carbon should be present in the form of amorphous carbon. Amorphous carbon is preferred because it has a greater abrasive effect when compared to graphite carbon; in addition, it is conducive to the carbide formation with the metallic materials.

As already stated above, the preferred metal carbide to be used is one that is created by liquid infiltration of the respective metal into the porous structure around the fiber structure under reaction with carbon. The volume portion of the filled fiber structure should be in a range between 5% and 50%, preferably in a range of 15% to 30% in regard to the volume of the composite material. The range between 15% and 30% is preferred because the residual amount of free metal is then limited, a high capillary effect resulting in quick infiltration is achieved, and the reaction with the fibers is also acceptably low.

All types of fibers and modifications, such as high-strength or high-modulus fibers can be used for the fiber structure made of carbon fibers, however, fibers characterized by a tensile modulus of elasticity of 200 GPa to 300 GPa are preferred. Such fibers exhibit a sufficiently high thermal stability both during the manufacture of the composite material under thermal influence and during the use of the tool for machining applications. In addition, the highest fiber strengths of the composite materials were achieved for these carbon fibers. Orientation of the continuous fibers can be in any spatial axis, however, a semi-isotropic design in at least one plane is preferred.

For a full understanding of the present invention, reference should now be made to the following detailed description of the preferred embodiments of the invention as illustrated in the accompanying drawings.

BRIEF DESCRIPTION OF THE DRAWINGS

FIG. 1A is an over-head view of a one-part milling disc;

FIG. 1B is a section along the cutting line I—I in FIG. 1A;

FIG. 2A is an over-head view of a milling head with a carrier; device and inserted milling cutter;

FIG. 2B is a section along the cutting line II—II in FIG. 2A;

FIGS. 5A and 5B show a tapered and a cylindrical grinding stone;

FIG. 6 shows a cutting shaft with several cutting surfaces distributed around the circumference and running in axial direction of the shaft.

DESCRIPTION OF THE PREFERRED EMBODIMENTS

Figure 3:
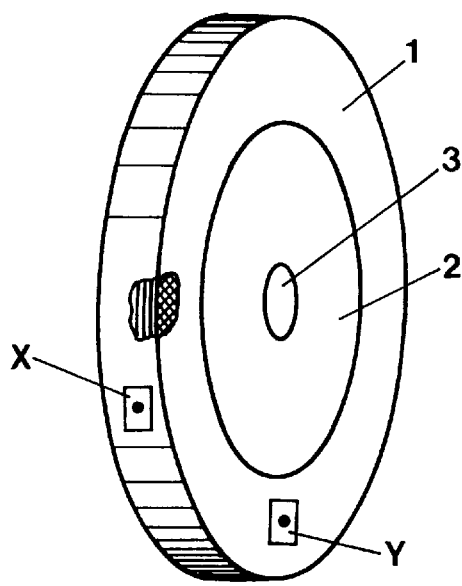
FIG. 3 is a grinding wheel with an outer abrasion ring and an inner carrier disk.
Figure 4:
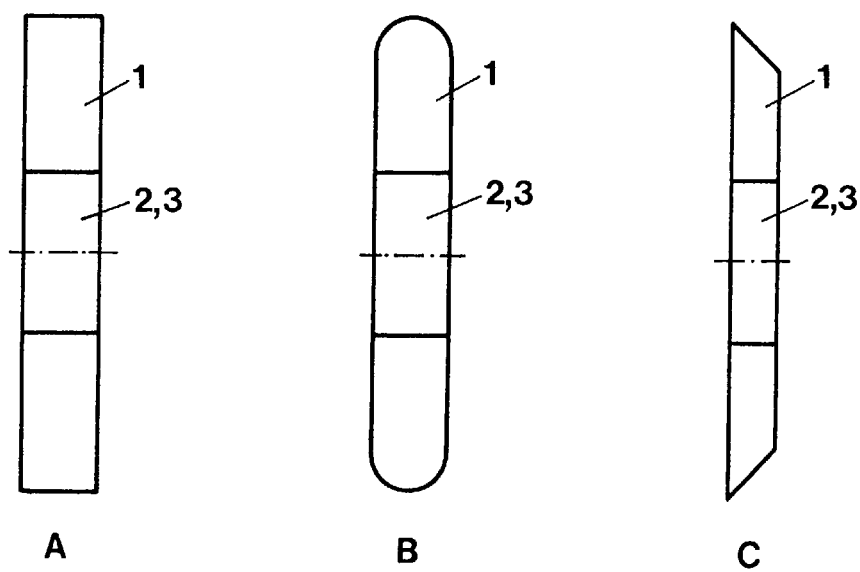
FIGS. 4A, B, and C show cross sections of the abrasion ring of FIG. 3 with various abrasive contours.

The present invention will now be described with reference to FIGS. 1–7B of the drawings. Identical elements in the various figures are identified by the same reference numerals.

The following processing steps are to used to manufacture tools subject to the invention for machining workpieces as presented in FIGS. 1 to 7.

To manufacture an abrasion ring 1, such as is shown in FIG. 3, that after manufacturing, is placed on a carrier disk 2, that has a hole 3 for inserting a drive shaft, where a mold corresponding to the shape of the abrasion ring 1 is manufactured. A fiber structure, preferably one of carbon, but if required, also of ceramic fibers is formed in this mold. This structure should have a defined two or three-dimensional structure, for example in the form of weaves, knits or webs, where it should be observed that continuous fibers are to be used. Individual layers of fibers are stacked onto each other in an orthotropic manner such that the individual fibers are oriented in a defined manner in relation to the abrasive surface. This means that a high portion of fibers should end in a plane perpendicular to the abrasion surface such that they are positioned in a brush-like manner to the later abrasive surface. In another processing step, this fiber structure is then soaked with carbon-rich polymers, also called precursors. Such soaking of the individual fibers may also occur prior to building the fiber structure, by either soaking the individual fibers or the individual fiber layers in the form of webs, knits and/or weaves. This soaking can be carried out through resin injections, coiling or prepreg technology. Preferably, the carbon content of the polymer should be >30% in regard to the mass after the pyrolysis, which will be referred to again below; this high carbon content will be used to form the required carbides, as will become apparent later. Additional filler materials can be added to this polymer which is used for coating, soaking and embedding (matrix) of the fibers, where said filler materials shall basically consist of hard materials in addition to carbon. These hard materials should be coordinated with those that cause the machining effect. It should be noted that the grain size of these filler materials, in powder form, should be a suitable grain size which should be in the range of 1 to 100 $\mu$m. These filler materials can be added to the polymer prior to soaking of the fiber structure, such that a polymer suspension for soaking is provided. With regard to the volume of this suspension, the filler material portion should be <30 percent in volume. The polymer suspension can be injected into the fiber body with a suitable injection pressure of 5 bar and temperature of about 200° C.

After curing, the body created in this manner is subjected to a pyrolysis, preferably under addition of a protective gas, such as nitrogen, without pressure at a temperature of about 800° C. As a result of the pyrolysis, the polymer matrix is converted into amorphous carbon. At the same time, due to the loss of volume, a micro crack structure is formed around the fiber structure with an open porosity that can be adjusted in a suitable manner by the amount and type of injected polymer suspension. The now present preform with the defined micro crack structure has a basic inherent stability and corresponds to the outer dimensions of the abrasion ring 1 to be manufactured, as shown in FIG. 3.

In an additional processing step, a liquid metal, for example, liquid silicon is infiltrated into this preform. If liquid silicon is used for this infiltration, a temperature of about 1650° C. is set, that is, the infiltration temperature is above the melting point of silicon, which is 1410° C. The infiltration can be controlled if a suitable vacuum is applied during the infiltration such that a very rapid filling of the pores becomes possible. The liquid, infiltrated silicon reacts with the carbon that is present due to the pyrolized resin or through addition, as a filler material in the resin or polymer, to become silicon carbide, which is a suitable hard material to achieve the desired abrasive properties of the tool. The silicon carbide formed in situ exhibits a distinctive crystalline structure. The temperature increase to 1650° C., that is, a temperature above the melting point of silicon, during infiltration is conducive from the aspect of grain growth, because it has been found that the hard material grain should not be too small in order to ensure a defined breaking out, in order to renew the abrasive surface during the operation of the tool through breaking out of hard material grains.

After a holding time of 2 hours at a temperature of 1650° C. a composite material is obtained that exhibits about 60 percent in weight fibers and in the matrix 5 percent in weight carbon, 30 percent in weight silicon carbide and 5 percent in weight silicon. The grain size of the silicon carbide is in a range of 5 to 20 μm and can be increased to about 50 μm by a post heat treatment at about 2000° C.

The silicon melt can be enriched with other suitable additives to form suitable hard materials. A preferred additive is boron especially in an amount of <10% relative to the mass of the silicon. The addition of boron not only reduces the melting point of silicon, which is conducive to a gentle treatment of the fiber structure (low thermal stress), but boron also forms borides with the infiltrated metals, that is, in the case of the infiltration of silicon as the metal, silicon boride and boron carbide are created as hard materials in addition to silicon carbide.

If 3 percent in weight of boron is added to the silicon melt, the melting temperature is reduced to 1385° C. and, as previously stated, a larger silicon carbide grain is created that is larger by a factor of about 10; in addition, the creation of silicon boride and boron carbide has been observed.

The abrasion ring 1 as has been described above in its manufacturing is then clamped, bolted, or in some other manner bonded to the carrier disk 2 as shown in FIG. 3. For example, a connective coating can be applied between the carrier disk and the carrier ring where the composition of said coating is dependent on the material of the carrier disk 2. Preferred as a carrier disk is a carbon fiber body that is structured similar to the abrasion ring 1 and that distinguishes itself for instance by its low weight, which is advantageous especially considering the rotating mass of an abrasion disk, and furthermore by its resistance to high temperature conditions that the abrasion ring 1 subject to the invention may be exposed to. Finally, an additional advantage of a carrier disk 2 made of a carbon fiber structure is that the abrasion ring 1 is connected to the carrier disk via an interim coating of silicon, which together with the free carbon of the carrier disk 2 is converted to silicon carbide under heat, such that a strong connection is attained between carrier disk 2 and abrasion ring 1.

FIGS. 1A and 1B show a milling disk 4 with a take-up hole 3, where said milling disk has several blades 5 distributed over the circumference. This milling disk 4 is manufactured according to a method as explained above using the example of the abrasion ring 1.

FIGS. 2A and 2B show a milling head 5 exhibiting a carrier body 7, where individual machining tool parts 8, each provided with a cutting edge 9 are inserted in said tool parts 8. The carrier body 7 can be made of a carbon fiber structure corresponding to the carrier disk 2 of the embodiment of FIG. 3, where the individual tool parts 8 are in turn connected to the carbon fiber structure 6 by the described connection technology through, for example, a silicon coating. This connection technology offers the additional advantage that the tool pats 8 can be separated from the carrier body 7 through the application of an appropriate temperature to replace them with new ones in case of wear.

As FIGS. 4A, 4B and 4C show, the described method can be used to manufacture very differently profiled working areas of the tool in a defined manner, for example, rounded or tapered, as the FIGS. 4B and 4C clearly indicate. To achieve such a contour of the working area, there is no need to subject the tool manufactured using the method described above to finishing work, because the final contour can already be achieved with very close tolerances through shaping the prebody or the preform. For profiling tools, a precise geometry may be achieved through, for example, diamond tools.

FIGS. 5A and 5B show a tapered and a cylindrical grinding stone 10 that are each attached to a carrier pin 11. The preferred material for this carrier pin is a ceramic composite material or metal, for example elastic steel. Positive locking and force locking can be accomplished as described above, for example, through a silicon coating or through soldering, where the carrier pin is formed squarelike, for example, and inserted into a corresponding hole in the grinding stone 10.

FIG. 6, which shows a cutting shaft, clearly indicates that also machining tools with large dimensions can be manufactured. This cutting shaft 12 has groove-like indentations 14 running parallel to the rotating axis 13, where the outer edge of said indentations 14 protrude radially further towards the outside than the other one (comparable to the presentation in FIG. 1A), where the protruding edge forms a cutting edge. This cutting shaft is also manufactured according to the manufacturing method described above.

Figure 7A:
FIGS. 7A and 7B each show a scanning electron microscope image of the composite material subject to the invention in two planes perpendicular to one another, where the cross section in FIG. 7A corresponds to the emphasized areas designated with the letter X in FIGS. 3 and 6, while the image in FIG. 7B corresponds to the areas designated with the letter Y in FIGS. 3 and 6.
Figure 7B:
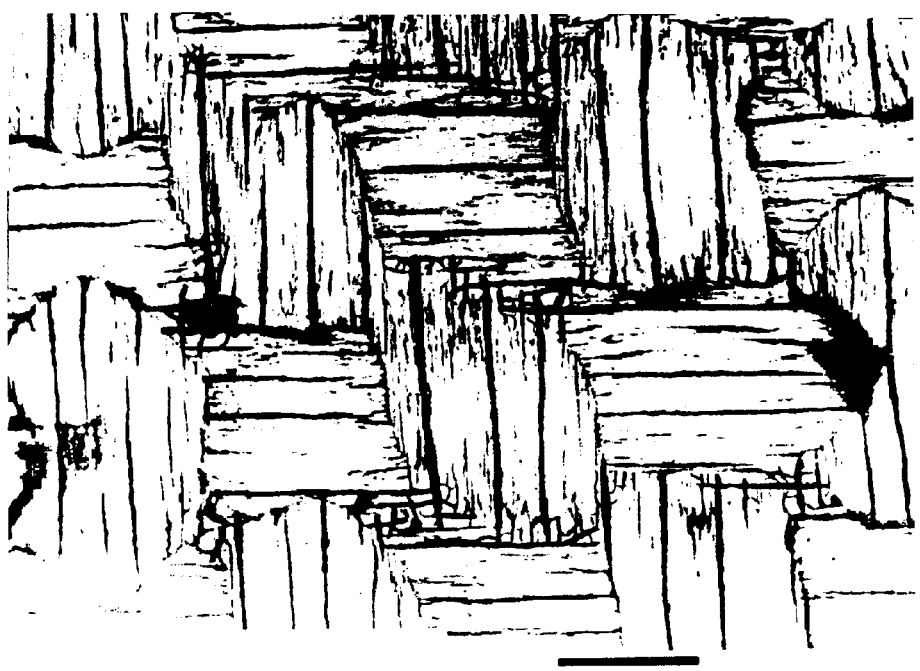

FIGS. 7A and 7B show a scanning electron microscope image (SEM image) of the area segments designated in FIGS. 3 and 6 with X and Y, that is, area segments that show the structure of the tool in planes perpendicular to one another.

As the cross-section of FIG. 7A shows, two-dimensional carbon web layers are running along and perpendicular to the sectional plane, where the perpendicular fibers cause the brush-type effect described above. While in the image, the carbon fibers are rendered by the black areas, the white areas represent silicon carbide and residual silicon. The course of the fibers is clearly recognizable from the silicon carbide are embedded in the matrix around the fibers. The images in FIGS. 7A and 7B have a 15× magnification. The layer-like structure of the material formed by the individual layers of the web can be recognized in FIG. 7A. As already stated, the carbon fiber rovings are oriented in 0° and 90° in relation to the plane of the blade. The material consists of about two thirds carbon and about one third SiC, which depends on the set fiber volume content in the polymer condition, that is the condition where the fibers are embedded into the polymer or precursor or soaked therein.

In contrast, in FIG. 7B, showing the section perpendicular to the cross-section of FIG. 7A, nodes, the web type of the fiber and the close connection between fiber and matrix can be recognized. In the node areas of the fiber rovings, clusters of residual matrix materials may occur, which can be recognized by the larger interconnected white areas. In addition, the web with weft and warp threads, oriented perpendicular to one another, can be seen in FIG. 7B.

There has been shown and described a novel method and device for manufacturing workpieces or blocks from meltable materials which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart form the spirit and scope of the invention are deemed to be covered by the invention which is to be limited only by the claims which follow.

What is claimed is:

1. In a tool for machining operations, wherein the tool includes at least one machining die with at least one working area in the form of a cutting surface, the improvement wherein the tool is made from a preform comprising continuous fibers, which forms a fiber structure, of at least one carbon and ceramic material and a matrix containing carbon, and wherein a liquid metal is infiltrated into the preform in order to form a hard material in situ by a reaction of the metal with the carbon of at least one of the carbon fibers and carbon to form a composite material, a portion of the fibers ending in a region of the cutting surface of the working area of the tool.

2. Tool as set forth in claim 1, wherein the fiber structure is made in the form of at least one of a web, a weave and a knit.

3. Tool as set forth in claim 1, wherein the fibers of the tool ending at the surface region of the working area have their axes oriented such that they exhibit a larger directional component in a direction normal to the surface region of the working area than perpendicular to it.

4. Tool as set forth in claim 1, wherein at least a portion of the fibers are made of carbon, where the portion of the carbon fibers in relation to the fiber structure is between 50% and 100%.

5. Tool as set forth in claim 1, wherein at least a portion of the hard material is present in the form of crystalline carbide.

6. Tool as set forth in claim 5, wherein the grain size of the crystalline carbide is between 5 and 100 $\mu$m.

7. Tool as set forth in claim 5, wherein the crystalline carbide is a carbide selected from the group consisting of silicon, titanium, zirconium, chromium and vanadium carbide.

8. Tool as set forth in claim 7, wherein the crystalline carbide is silicon carbide.

9. Tool as set forth in claim 5, wherein crystalline boride is present in the hard material in addition to crystalline carbide.

10. Tool as set forth in claim 1, wherein the matrix contains a residue of unreacted metal and wherein the portion of said unreacted metal is less than 10 percent in volume of the entire composite material.

11. Tool as set forth in claim 1, wherein at least a portion of the fibers are made of ceramic materials, whereby the portion of these ceramic material fibers is between 50% and 100% with respect to the entire fiber structure.

12. Tool as set forth in claim 1, wherein the fiber volume content in relation to the unit of volume of the composition material is 20 to 70%.

13. Tool as set forth in claim 1, wherein the matrix comprises powdery filler materials.

14. Tool as set forth in claim 13, wherein the filler materials have a grain size in a range of 1 $\mu$m to 100 $\mu$m.

15. Tool as set forth in claim 13, wherein the content of filler materials is less than 50 percent by volume of the matrix.

16. Tool as set forth in claim 13, wherein the powdery filler materials comprise amorphous carbon.

17. Tool as set forth in claim 13, wherein each filler material component is present in an amount of less than 10 percent by weight of the composite material.

18. Tool as set forth in claim 7, wherein the crystalline carbide is made by liquid infiltration of the respective metal into a porous structure around the fiber structure under reaction with the carbon.

19. Tool as set forth in claim 1, wherein a volume portion of liquid metal is in a range between 5% and 50%, in relation to the volume of the composite material.

20. Tool as set forth in claim 4, wherein the carbon fibers have a tensile modulus of elasticity in a range between 200 and 300 GPa.

21. Tool as set forth in claim 1, wherein the volume portion of the hard material in the composite material is between 10% to 50%.

22. Tool as set forth in claim 2, wherein the matrix prior to formation of hard material in situ by reaction of the metal with the carbon, comprises carbon and an additional hard material.

23. Tool as set forth in claim 5, wherein the grain size of the crystalline carbide is greater than 10 $\mu$m.

24. Tool as set forth in claim 1, wherein the liquid metal comprises silicon.

25. Tool as set forth in claim 1, wherein the liquid metal comprises one or more metals selected from the group consisting of titanium, zirconium, chromium and vanadium.

26. Tool as set forth in claim 1, wherein the liquid metal comprises less than 10% boron.

27. Tool as set forth in claim 1, wherein the liquid metal comprises 3% boron.

28. Tool as set forth in claim 1, wherein the continuous fibers, prior to formation of hard material in situ by reaction of the metal with the carbon, comprise at least 505 fibers selected from the group consisting of one or more of silicon carbide and silicon nitride.

29. Tool as set forth in claim 1, wherein the fiber volume content in relation to the unit volume of the composite material is between 50 and 70%.

30. Tool as set forth in claim 1, wherein a volume portion of liquid metal is in a range between 15% and 30% in relation to the volume of the composite material.

31. Tool as set forth in claim 1, wherein the hard material provides abrasive properties.

32. Tool as set forth in claim 1, wherein the fibers are regularly organized.

33. A tool for machining operations, wherein the tool includes at least one machining die with at least one working area in the form of a cutting surface, produced by a method comprising:
providing a preform comprising continuous fibers, in a fiber structure, of at least one of carbon and ceramic material and a matrix containing carbon; and
infiltrating liquid metal into the preform to form a hard material in situ, by a reaction of the metal with the carbon of at least one of the carbon fibers and carbon, wherein the fibers form a fiber structure in a composite material of the tool, a portion of the fibers terminating at the cutting surface of the working area of the tool.

34. A tool for machining workpieces, comprising:
at least one machining die having a cutting edge at a surface of the tool; and
a body for positioning and retaining said at least one machining die,
wherein said machining die comprises a composite material having a fibrous component and a matrix component, said fibrous component having a regular orientation of continuous fibers selected from the group consisting of ceramic and carbon-derived, at least a portion of which terminate at said cutting edge, and
wherein one of said fibers and said matrix are a product resultant from an in situ reaction of a metal phase and carbon to produce a metal-carbide abrasive.

* * * * *